US008909243B2

(12) United States Patent
Balasaygun et al.

(10) Patent No.: US 8,909,243 B2
(45) Date of Patent: Dec. 9, 2014

(54) CAST-TO-CALL

(75) Inventors: Mehmet C. Balasaygun, Freehold, NJ (US); Jason H. Vick, Pine, CO (US)

(73) Assignee: Avaya Inc., Basking Ridge, NJ (US)

( * ) Notice: Subject to any disclaimer, the term of this patent is extended or adjusted under 35 U.S.C. 154(b) by 963 days.

(21) Appl. No.: 12/835,021

(22) Filed: Jul. 13, 2010

(65) Prior Publication Data

US 2011/0045845 A1 Feb. 24, 2011

Related U.S. Application Data

(60) Provisional application No. 61/235,838, filed on Aug. 21, 2009.

(51) Int. Cl.
*H04W 24/00* (2009.01)
*H04L 29/08* (2006.01)
*G06F 9/54* (2006.01)
*H04L 29/06* (2006.01)
*H04M 7/00* (2006.01)
*H04W 4/02* (2009.01)
*H04W 64/00* (2009.01)

(52) U.S. Cl.
CPC .................. *H04L 67/24* (2013.01); *H04W 4/02* (2013.01); *H04W 64/00* (2013.01); *G06F 9/543* (2013.01); *H04L 65/403* (2013.01); *H04L 67/306* (2013.01); *H04L 67/04* (2013.01); *H04M 7/0057* (2013.01)
USPC .................. 455/456.1; 455/456.2; 455/456.3; 455/422.1

(58) Field of Classification Search
CPC ....... H04W 4/02; H04W 4/021; H04W 4/025; H04W 4/04; H04W 64/00; H04W 64/003; H04W 64/006
USPC ............. 455/456.1–457, 404.2, 414.1–414.4, 455/422.1
See application file for complete search history.

(56) References Cited

U.S. PATENT DOCUMENTS

| 8,311,526 | B2 * | 11/2012 | Forstall et al. | ............. 455/414.3 |
|---|---|---|---|---|
| 2010/0216491 | A1 * | 8/2010 | Winkler et al. | ............... 455/457 |
| 2011/0217992 | A1 * | 9/2011 | Fraccaroli | .................. 455/456.3 |
| 2013/0053002 | A1 * | 2/2013 | Hymes | ........................ 455/414.1 |
| 2014/0082199 | A1 * | 3/2014 | Johnson | ........................ 709/225 |

* cited by examiner

*Primary Examiner* — Jean Gelin
(74) *Attorney, Agent, or Firm* — Sheridan Ross P.C.

(57) ABSTRACT

A communication device can be equipped with global positioning system (GPS) equipment and one or more accelerometers and/or gyroscopes that can be used to determine one or more of the direction or velocity at which the communication device is "cast" by coupling the location information of the communication device, such as using GPS coordinates, cell tower triangulation, or the like, with the "cast direction" of the communication device—thereby creating a cast vector. The strength of the cast may be analyzed to assist with determining how far the cast vector should be projected. The communication device can then determine which, if any, other communications device, entities, and/or objects are within the cast vector. The direction and strength of the cast can be used to assist in creating either a two or three-dimensional sensible area, that originates with the location of the calling party, and extends therefrom a certain distance.

20 Claims, 4 Drawing Sheets

CAST-TO-CALL

RELATED APPLICATION DATA

This application claims the benefit of and priority under 35 U.S.C. §119(e) to U.S. Patent Application No. 61/235,838, filed Aug. 21, 2009, entitled "MOJO," which is incorporated herein by reference in its entirety.

FIELD

An exemplary aspect is directed toward enhancing communications. Even more specifically, an exemplary embodiment is directed toward an ability to contact another person, entity, or object within a two or three-dimensional sensible zone.

BACKGROUND

Calling users has always been accomplished by dialing a series a numbers or entering a series of characters assigned to that user's communication device. SIP (Session Initiation Protocol) has expanded this paradigm to allow a user to be reached on a plurality of communication devices by having a calling party enter a single address of record (AOR). Even with the advent of SIP and AOR, a calling party is still required to at least know a user's address or phone number and dial that number to contact the party.

SUMMARY

One drawback of prior dialing solutions is that they require a calling party to enter or select an address for the user they are trying to contact. This takes time and can be particularly inconvenient when the calling party does not know the number they wish to dial off of the top of their head.

One exemplary embodiment is directed toward a new dialing paradigm whereby a user is allowed to "cast," borrowing an analogy from the fishing industry, their communication device in the direction of a person, object, or entity they wish to contact. This causes the communication device to automatically determine the party to call, and originate a call or communication to that party.

In accordance with one exemplary embodiment, the communication device can be equipped with global positioning system (GPS) equipment and 1, 2, 3 or more accelerometers and/or gyroscopes that can be used to determine one or more of the direction or velocity at which the communication device is "cast" by coupling the location information of the communication device, such as using GPS coordinates, cell tower triangulation, or the like, with the "cast direction" of the communication device—thereby creating a cast vector. Additionally, the strength of the cast may be analyzed to assist with determining how far the cast vector should be projected. The communication device can then determine which, if any, other communications device, entities, and/or objects are within the cast vector. As discussed in greater detail hereinafter, the direction and strength of the cast can be used to assist in creating either a two or three-dimensional sensible area, that originates with the location of the calling party, and extends therefrom a certain distance. A size and shape of this two or three-dimensional sensible area can be governed by one or more of cast direction, cast velocity, a pre-defined geographic boundary, a plurality of pre-defined geographic areas, such as different geographic areas correlated to different cast vectors, and like.

If, for example, only one communication device is detected within a particular cast vector, then the communication device can resolve the address for the target communication device and automatically initiate a call to that target communication device. This allows, for example, a calling party to originate a call without necessarily requiring interfacing with their key pad.

If two or more communications devices, objects, or entities are within the call vector, then a number of different options may be implemented. In a first option, the communication device may provide via a user interface, a list of the potential target communication devices, objects, or entities to the user and the user may be allowed to select the device, and therefore (if a person's communication device) the user holding the device, thereby causing a call or communication to that device to be initiated.

In a second option, contact history or address book information of the calling party may be compared to the addresses of potential target communications devices, and if any device in the calling party's call history is present within the case vector, then the calling communication device may automatically initiate a call to that device, by presuming the calling party wants to talk to the same person again.

In a third option, the calling communication device may have a list of pre-provisioned phone numbers that can be "cast at to call." If any communication device in that list is within the call vector created by a calling party's casting motion, the calling communication device may automatically call that device.

In a fourth option, the calling communication device may automatically issue multiple calls to all communication devices within its call vector and if multiple devices answer, a conference call may be established.

In a fifth option, one or more of context and presence information associated with the user can be queried, and this combined with a cast-to-call motion used to assist in determining who or what the user is trying to contact. Other options will also become readily apparent.

In accordance with yet another exemplary embodiment, a user is allowed to "cast" their call to an object, e.g., a store, restaurant, building, billboard, radio, T.V., set-top-box, and in general any object. The object can have an associated identifier, such as a phone number, IP address, wireless address, RFID tag, or in general, any identifier that allows the user to contact the object. The contact could be dialing a phone number associated with the object, spawning a web browser session directed toward the IP address associated with the object, pushing or pulling information associated with the object, or the like. The cast-to-communicate technique could also be dynamic such that, for example, there is identification information associated with a radio, T.V., multimedia presentation, billboard, or in general, any object. This identification information can be obtained by the communications device such that the communications device is able to establish a communication session with an entity, i.e., a person, web server, call center, or in general any object.

As an example, as a user is driving along, they see a billboard with an advertisement for skiing. Upon casting-to-call in the direction of the billboard, a lookup is performed based on the call vector toward the billboard, the location of the user, and the identifier associated with the billboard and a communication session established. During a communication session, a coupon could be automatically downloaded to the user's communication device and a call initiated to the ski resort to book a reservation.

In another exemplary embodiment, utilizing the same call vector technology, the user casts-a-call toward the radio which is playing a specific song. The cast-to-call in this instance is for establishing a communication session, for example, via Bluetooth®, Wi-Fi, or the like, that allows purchasing of the song that could be, for example, downloaded in MP3 format to the communications device. Here, the identification information of the radio (and song) could be communicated to the user's communication device via a wireless technology such as Bluetooth® IR, or comparable technology. Similarly, the downloaded song could be sent to another address associated with the communications device, such as an email address.

Exemplary mechanisms by which the communications device is able to get the list of phone numbers by casting are:
1) Communication device sends a "beam" that gets responded to by other devices (e.g., phones, bulletin boards, restaurants, objects, vehicles, electronic devices, etc.) in the beam's path. The response includes the phone number information, and may contain some additional identifier, such as a user name, so that the party who wants to call knows whom to select when there are multiple responses;
2) The communications device sends its GPS coordinates and position (e.g. x,y,z coordinates) to a central server that tracks all devices, including billboards, cell phones, other user's, objects, and the like, based on the input from the "casting" device, the central server can return a list of target devices that appear within the vector path and which can also be defined as a two or three-dimensional sensible area.

In accordance with one exemplary embodiment the discovery and connection to the target devices in a vector path can be peer-to-peer based with, for example, a combination of one and two above. Once the target is identified, a call or contact can be placed using a normal telephone and network procedures, not necessarily in an ad-hoc peer-to-peer fashion, although this is possible as well utilizing, for example, WiFi, Bluetooth®, or comparable technologies that support peer-to-peer connectability and communications.

In accordance with another exemplary embodiment, the system utilizes input from one or more of a gyroscope, accelerometer, GPS, cell phone triangulation, call vector information, and velocity information as part of a dialing process.

In accordance with yet another exemplary embodiment, the system allows connectability to one or more other users, objects, devices, or the like, while maintaining the confidentiality of the contact information associated with that device. As an example, a user is in a traffic jam with a plurality of cars all around them that are at a dead stop. The user, noticing a woman in the car in the next lane, and having two small children, is developing a flat tire on the driver's side rear of the car. Being a good Samaritan, the user initiates a cast-to-connect communication session by "casting" the communication device in the direction of the woman's car that is developing the flat tire. The system then determines whether the woman in the car is connectable to, for example, looking at all communications devices within the two or three-dimensional sensible area associated with the call vector and velocity information, and providing to the good Samaritan, for example, a list, such as a description by make and color, of the vehicles within the call vector. This list can be displayed on the communication device associated with the good Samaritan, with the good Samaritan being able to select the woman with the flat tire if it is present in the list. However, and in accordance with one optional embodiment, the system may not provide for any number of reasons, the actual telephone number associated with the woman developing the flat tire. Instead, the communication system could initiate a call, SMS, text message, or the like, without disclosing the contact information to the good Samaritan.

In terms of being able to assist with identifying the car with which the woman developing the flat tire is associate, one exemplary embodiment includes the ability of various user devices to contain profiles but define information such as color and make of vehicle the user is driving, or in general any parameter a user would like to associate with their communication device, that describes some aspect of their preferences, surroundings, or the like. In yet another exemplary embodiment, the object, in this case the vehicle could be equipped with an identifier itself, such as an RFID tag, GPS locator, or in general any technological solution that allows another person or device to identify that particular object. This object identifier could then be cross-correlated via a database comparison to the owner of the vehicle, with a telephone number thereof being discoverable through this car's correlation. Having the contact number, a communication could then be initiated to the woman with the flat tire as previously discussed.

In accordance with yet another exemplary embodiment, context can be integrated into the determination as to what information should be returned to the communications device. For example, if the cast-to-connect vector is in the direction of a billboard, where in conjunction with establishing a communication session between the billboard and the communications device, a system, such as a server, could identify one or more of profile information, presence information, and personal information associated with a communications device. Therefore, if it is determined that the communications device is associated with a male user, a first set of content is delivered to the communications device and accordance with yet another exemplary embodiment, if it is determined that the user associated with the communications device is a female user, a different set of information, such as advertisements, could be delivered to the user associated with the communications device.

Extending upon this concept, preferential treatment could also be associated with certain carriers for certain cast-to-connect operations. As one example, if a billboard is for a specific product, and a communications device is associated with a first national wireless carrier, a first type of information, advertising, or the like may be communicated to the communications device. However, if another national wireless carrier is associated with the communications device, different information, such as coupons, special offers, and the like, can be communicated to the communications device. As an additional option, the user can be connected to another entity, such as a call center to assist the user with answering any questions they may have as a result of seeing that particular billboard.

In accordance with yet another exemplary embodiment, one or more of context and presence information can be used to assist with determining the person, entity, or object with which the user desires to communicate. Even more specifically, if a calendar associated with the user's communication device indicates the user is scheduled for dinner at 7 PM, and the user casts their communication device in a first direction which reveals that there are numerous people, two buildings, one restaurant, three cars, and a billboard within the two or three-dimensional sensible area, the user's indication that they are dining at 7 PM, and given that it is now 6:50 PM, can be assumed to be a desire to request a menu from the restaurant. Therefore, the communications device could cast-to-connect to the restaurant and, for example, download a menu and provide an interface for making reservations.

Expanding upon this idea, it could further be determined the person the user is meeting for dinner is already in the restaurant with the communications device offering an option to the user to connect with their dinner date.

In another exemplary embodiment, the cast-to-connect functionality can be correlated to one or more of user input, device movement, such as rotate left for selecting party one, rotate device right for selecting party two, address book information, history information, buddy-list information, authorized cast-to-call recipient lists, and the like, can also be used to assist with determining which one or more entities, objects, or persons the communications device should connect to or should display as being connectable to, when the user initiates a cast-to-connect movement.

As an example, in an open-floor or factory type environment where there may be a number of colleagues within the cast-to-call area, the communications device can compare the detected colleagues within the cast-to-connect sensible area to the colleagues listed in the communication device. Upon a match, the display of the communication device can show, as a first set of potential people to connect to, those persons that are also in the communication device's address book. As a second list, the communications device can display those people in the sensible area that are not also located in the communication device's address book.

Accordingly, an exemplary embodiment is directed toward an enhanced communications device.

Even more specifically, an exemplary embodiment is directed toward a communications device having one or more of accelerometers, gyroscopes, GPS coordinate determination modules, and cell-phone triangulation modules that allow the communications device to determine a current location, and a call vector therefrom.

Additional aspects are directed toward utilizing a call vector to create a two or three-dimensional sensible zone, and determining one or more of persons, objects, entities, or the like, that are connectable to within that sensible zone.

Even further aspects are directed to hiding the contact information associated with the one or more of the person, object, or entity that is detected within the sensible zone, yet still allowing the caller to establish a communication session, send a message to, or otherwise contact the one or more of the person, entity or object.

Additional aspects are directed toward utilizing a cast-to-call or cast-to-connect motion to automatically dial and establish a communication session with another party(s) or object.

Even further aspects are directed toward establishing a sensible zone, either in two or three dimensions based on a cast vector having a direction and a velocity.

Even further aspects are directed toward a GPS coordinate-to-number reconciliation that allows the system to contact a device or object at a location with a contact number, such as a telephone number, IP address, or in general, any identifier that can be used to facilitate a communication session therewith.

Even further aspects are directed toward determining one or more of entities, objects, and persons within a sensible zone, and providing on a selectable user interface a list corresponding to the one or more of the entities, objects, and persons thereby allowing the user to select one or more thereof to establish a communication session therewith.

Additional aspects of the invention are directed toward utilizing one or more of context, content, and presence information to determine information to be exchanged between the communications device and another object, person or entity.

Even further aspects are directed toward maintaining a database of contact information associated with one or more specific GPS coordinates.

Another aspect is directed toward connecting a call, without a user having to dial a phone number.

While the various embodiments discussed herein will be illustrated in relation to a communication session, it should be appreciated that the term "session" does not necessarily require back-and-forth communications between one or more parties, objects, or devices. As an alternative, the "session" could be a one way transmission of information to which no response is received.

Furthermore, the terms cast-to-connect and cast-to-call and variations thereof are used interchangeably and generally include utilizing a motion of a communications device and an associated call vector to connect to one or more of another user, a device and/or an object.

These and other advantages will be apparent from the disclosure contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

The exemplary embodiments of the invention will be described in detail, with reference to the following figures, wherein.

DETAILED DESCRIPTION

Some embodiments will be illustrated below in conjunction with an exemplary communication system. Although well suited for use with, e.g., a system using switch(es), server(s) and/or database(s), communications endpoints, wired and/or wireless communication equipment, etc., the embodiments are not limited to use with any particular type of communication system or configuration of system elements. Those skilled in the art will recognize that the disclosed techniques may be used in any communication application in which it is desirable to provide enhanced contactability.

Figure 1:
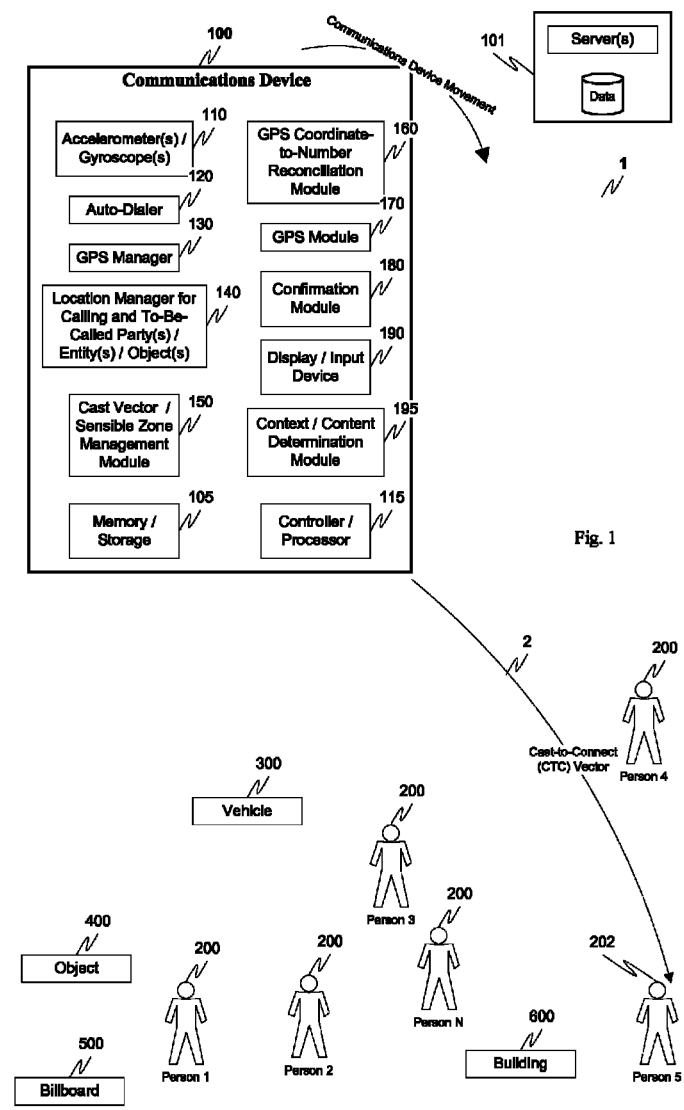
FIG. 1 illustrates an exemplary communications environment.

Referring initially to FIG. 1 an exemplary communication environment 1 will be described in accordance with at least some embodiments. The communication system comprises (in addition to well-known componentry) a communication network connecting a plurality of communication devices, internet information sources, and the like.

In one embodiment, communication system may include a switch that may include a private branch exchange (PBX) system or any similar type of switching system capable of providing a telephone service to one or more entities such as an enterprise associated with the switch, a user associated with the switch, such as a caller or callee, or the like. The switch may be one of a number of known exchange systems including, but not limited to, Private Automated Branch Exchange (PABX), Computerized Branch Exchange (CBX), Digital Branch Exchange (DBX), or Integrated Branch Exchange (IBX). The switch may also comprise a switching fabric that provides for the connection of multiple endpoints such as communication devices associated with call(er or ing) participants, servers and databases. The switching fabric can provide the functionality to direct incoming and/or outgoing calls to various endpoints and further provides for conferencing capabilities between endpoints as well as the ability for forward information associated with presence.

Communication devices associated with the participants may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and conventional wired or wireless telephones. Additional devices associated with the participants may be computer-based internet browsers and/or applications specific to a particular communications modality.

FIG. 1 illustrates an exemplary communications environment 1. The communications environment 1 includes a communication device, such as communications device 100, and one or more objects, entities or persons, such as persons 200, vehicle(s) 300, object(s) 400, billboard(s) 500 and building(s) 600. The exemplary communications device 100 includes one or more of accelerometers and gyroscopes 110, an auto-dialer 120, a GPS manager 130, a location manager for calling and to-be-called parties, entities and objects 140, a cast vector/sensible zone management module 150, memory and storage 105, a GPS coordinate-to-number reconciliation module 160, a GPS module 170, a confirmation module 180, a display/input device 190, a context/content determination module 195 and controller/processor 115. In addition, the exemplary communications environment one can also include one or more servers and databases 101 to which the communications device is connectable to via, for example, a wireless communication connection.

In operation, a user, upon desiring to communicate with one or more of an entity, object, or other person(s), casts the communication device 100 in a particular direction. This communications device movement can be tracked by the accelerometers and/or gyroscopes 110 to determine a direction, and optionally velocity of the cast. With the GPS manager 130 knowing the current location of a communications device detected by the GPS module 170, the cast vector/sensible zone management module 150 creates a sensible zone in either two or three dimensions. As an option to help enhance the defining of the sensible zone, the user can be provided with an option of selecting the cast distance, such as near, medium, and far. As another option, the cast distance could be set to infinity thereby entering a "continuously on" mode where the communications device 100 continues to look for connectable devices, objects and/or persons within a sensible area.

This information could then be used by the sensible zone management module 150 in creating the geographic boundary in either two or three dimensions, which will be used by the location manager 140 to determine the entities, objects or persons within that sensible area. As an option, the communications device 100 can communicate with one or more servers and databases 101 that can, for example, maintain a database of the contactable entities, objects or persons, and their current GPS coordinates. As an alternative, or in conjunction with the use of the GPS coordinates, the system can also use cellular or radio tower triangulation techniques to assist with identifying a location of the persons, objects, or entities to which the caller associated with communications device 100 is capable of communicating with.

Thus, upon recognizing the cast vector and determining a sensible zone, the location manager 140, optionally with the cooperation of servers and databases 101, determines the person(s) in the call vector. The GPS coordinate-to-number reconciliation module 160, optionally in cooperation with one or more of the serves and databases 101, memory 105 and processor 115 then maps the GPS coordinate of the entities, objects and/or persons within the sensible area to a contact number associated therewith. As discussed, this contact number can be a phone number, IP address, or a general any identifier that will allow the communication device 100 to establish a communication sessions therewith. In this particular example, the communications device 100 was cast in the direction of Person 5 202 as determined by the cast-to-connect (CTC) vector 2.

If however more than one person is in the sensible area, one or more of the following actions can be taken. In accordance with a first exemplary aspect, the user can be queried as to which of the identified persons within the sensible area the user would like to connect to. In accordance with another exemplary embodiment, and again using the capabilities of one or more of the accelerometers and gyroscopes 110, a particular device movement can be detected and that movement correlated to the selection of a particular person identified within the sensible area. For example, the communications device 100 can display on display device 190 a list of three persons that were detected within the sensible area. If the user were to rotate the device left, the first person would be connected to, if the user were to rotate the device right, the second party were to be contacted, if the user were to shake the device, the third party would be contacted. Therefore, in accordance with this exemplary embodiment, in addition to showing a list of the person within the sensible area, the display device 190 could also include information telling the user what to do with the device to select one or more of the parties to communicate with.

Having the number(s) of the parties within the sensible area that the caller would like to communicate with, the communications device 100, in cooperation with the auto-dialer 120, can then automatically dial number associated with the person, such as person 202, that the user selected and connect a call thereto.

As discussed in greater detail hereinafter, and as illustrated in FIG. 1, the connectability of the communications device 100 need not be limited to persons, but can be extended to any object or entity, such as vehicle 300, objection 400, billboard 500, building 600, and in general any object, device, or entity that has an associated identifier(s).

Figure 2:
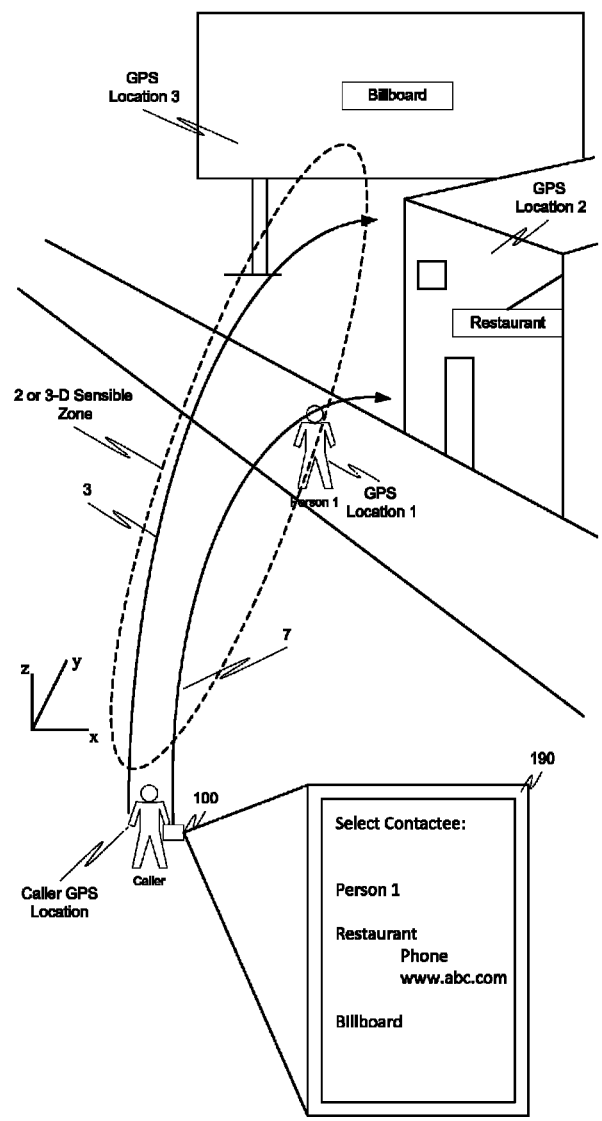
FIG. 2 illustrates an exemplary call vector and associated two or three-dimensional sensible zone.

As illustrated in greater detail in FIG. 2, a caller is shown with communications device 100 that has an associated display 190. In a first instance, the caller casts call vector 3 for which the two or three-dimensional sensible zone is created. In this particular example, the user was trying to connect to the restaurant, however the two or three-dimensional sensible zone only detected person 1 and the billboard within the sensible zone. The caller then performed a second cast 7 for which the restaurant and person 1 ended up being in the sensible zone (not shown). With the second cast, the user could be provided with a contactee list on display 190. The contactee list can be selectable such that the user can then, for example, select the restaurant as an entity with which the caller would like to establish a communication. Upon this selection taking place, and as previously discussed, the restaurant, since it is associated with GPS location 2, can be correlated to one or more of a web page, phone number, or other contactable information source to which the caller could establish a connection. As an optional example, and say for example, the restaurant has a phone number, a web page, and a reservation booking service, these three options could then be shown to the caller on display 190 such that the caller could further drill-down into the preferred type of communication they would like to establish with the restaurant.

As discussed, and as shown in FIG. 2, the billboard has an associated GPS location, which happens to be GPS location 3, the restaurant has a specific GPS location, which happens to be GPS location 2 and person 1 has a specific GPS location, which happens to be location 1. The mapping of GPS locations to associated contactees is straightforward for static objects, such as the billboard and restaurant. One exemplary embodiment is capable of capitalizing on the fact that many mobile communications devices now also include GPS receivers, which can be very useful for the situations in which the contactee is mobile, such as person 1. In accordance with one exemplary embodiment, the communications device associated with person 1 can forward the GPS information obtained by their communications device to the servers and databases 101 to assist with tracking that particular person's location, thereby providing an easier and quicker means for the system to determine a contact number associated therewith.

In accordance with another exemplary embodiment, and as previously discussed, the communications device 100 is capable of connecting to more than just persons, but also objects, entities, or in general any device having an associated contact number or identifier. Again, control commences with the detection of communications device movement which thereby creates a cast-to-connect vector, and an associated velocity. As with the previous embodiment, this associated velocity can be utilized to assist with establishing the sensible zone, and can also be used in conjunction with the user selecting the "distance" that they would like for the cast. With the call vector, the sensible zone is developed or determined, and similar to above, contactable persons and/or objects within the sensible area can be identified. As discussed, these could be restaurants, shops, people, dealerships, hotels, electronic equipment, information sources, billboards, vehicles, and in general any object or entity communications device 100 is capable of communicating with. If more than one person is within the sensible area, the user can be queried as to which one (or more) they would like to communicate with, as well as an application implemented that overlays the ability to look at address book information, history information, buddy-list information, and a list of authorized cast-to-call recipients to help narrow down specific person(s) the user associated with communications device 100 is attempting to communicate with. Once the user has selected one or more of the objects, persons, and entities within the sensible area, the number(s) associated therewith are retrieved such that the auto-dialer 120 can initiate a communications session therewith. As previously discussed, and in situations where a potential contactee has more than one contact number, the user can drill-down into a specific contactee's information to assist the user with connecting to the information source they are most interested in.

Figure 3:
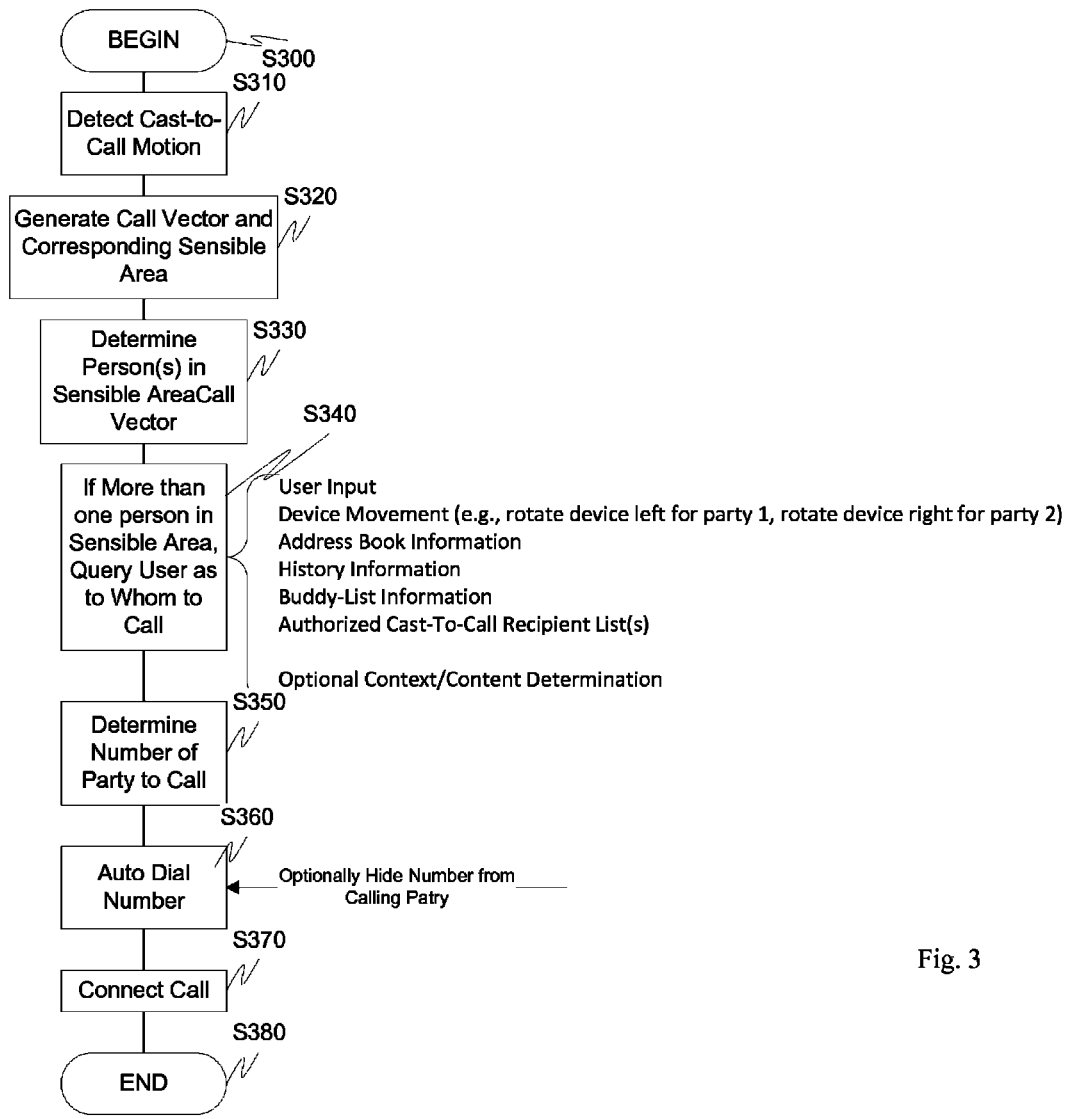
FIG. 3 is a flowchart outlining an exemplary method to connect to one or more persons, objects, or entities using the cast-to-connect technique.

FIG. 3 is a flowchart outlining an exemplary embodiment for the cast-to-call technique. In particular, control begins in step S300 and continues to step S310. In step S310, a cast-to-call motion is detected. Next, in step S320, a call vector is generated. Then, in step S330, one or more persons within the call vector are determined. Control then continues to step S340.

In step 340, if more than one person is within the sensible area, the user can be queried as to whom to connect with. As discussed, the list of potential contactees presented to the user can be narrowed down based on one or more of address book information, history information, buddy-list information, presence information, authorized cast-to-call recipient list, etc. In addition, one or more of contacts, content, and presence information can also be evaluated to further granularize the search results before the query is presented to the caller. Control then continues to step S350.

In step S350, and upon a user selecting a specific person with whom they would like to communicate, the contact number(s) or information associated with the person is determined. Next, in step S360, the user is optionally queried as to how they would like to contact the person, if multiple contact options are available, such as SMS, text, multimedia session, email, etc. Then, in step S370, an auto dialing function can be automatically performed that connects the communications device with the person. As will be appreciated, even though the term "dial" is used to establish a communication session with the person, it should be appreciated that the term can also include additional functionality such as allowing the user to initiate a browser session and connect to a web page (and/or social networking site(s) associated with the person), or in general establish any type of communication session, be it audio, video, multimedia, internet-based, or the like, with the person. Control then continues to step S380 where the control sequence ends.

Figure 4:
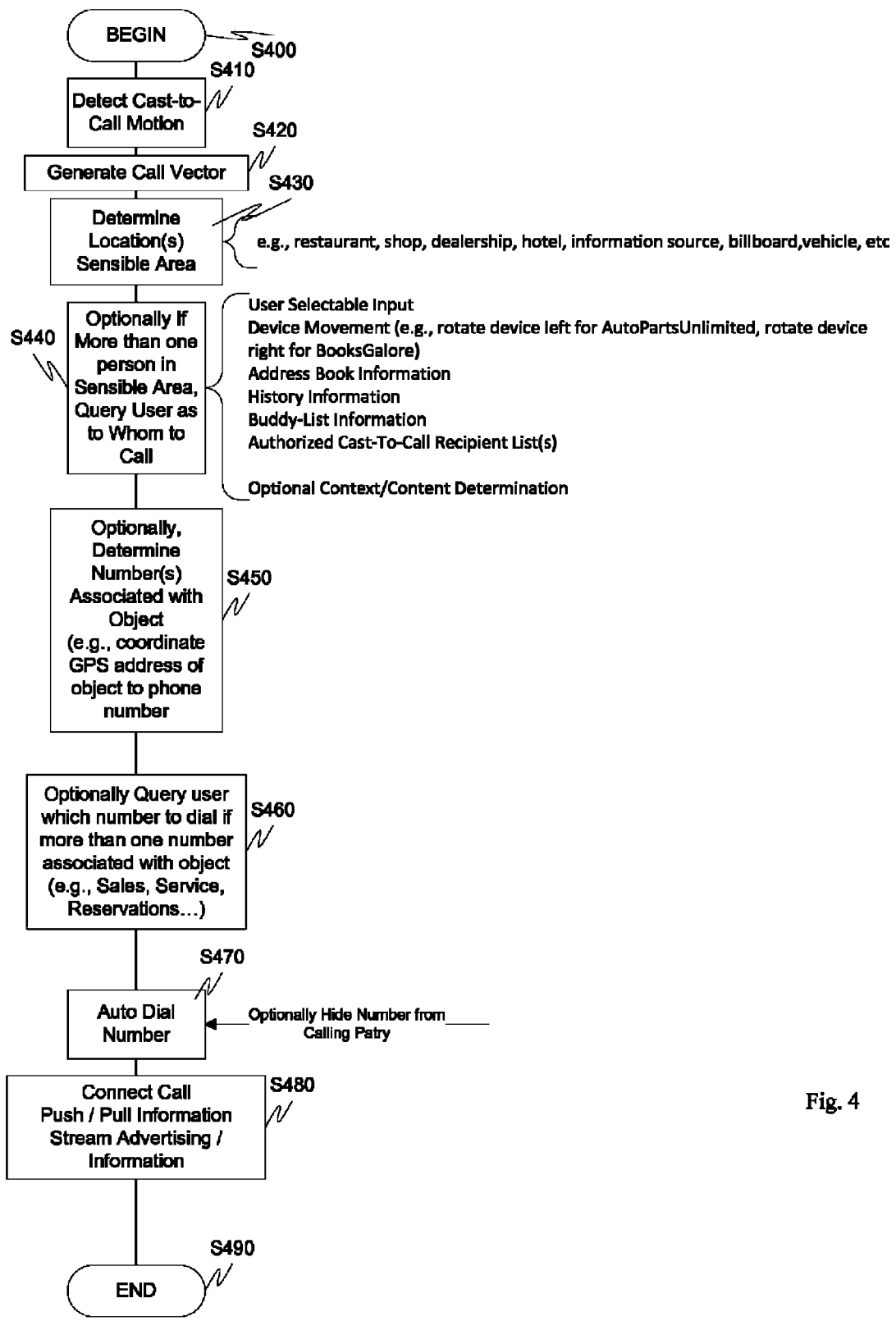
FIG. 4 is a flowchart outlining an exemplary method for utilizing the cast-to-connect technique to establish a communications session with one or more person, objects, or entities.

FIG. 4 is a flowchart outlining another exemplary embodiment for the cast-to-call technique. In particular, control begins in step S400 and continues to step S410. In step S410, a cast-to-call motion is detected. Next, in step S420, a call vector is generated. Then, in steps S430 and S440, one or more of one or more persons and one or more objects within the call vector are determined. Additionally, step 440, if more than one person is within the sensible area, the user can be queried as to whom to connect with. As discussed, the list of potential contactees presented to the user can be narrowed down based on one or more of address book information, history information, buddy-list information, presence information, authorized cast-to-call recipient list, etc. In addition, one or more of contacts, content, and presence information can also be evaluated to further granularize the search results before the query is presented to the caller. The person could then be contact in a manner similar to that outlined in FIG. 3. Control then continues to step S450.

Optionally, in step S450, and upon a user selecting a specific object with which they would like to communicate, the contact number(s) or information associated with the object is determined. Next, in step S460, the user is optionally queried as to how they would like to contact the object, if multiple contact options are available, such as different phone numbers for sales, service, reservations, and the like, and/or a web page associated with the object, SMS, text, multimedia session, etc. Then, in step S470, an auto dialing function is performed that connects the communications device with the object. As discussed, one or more of the above types of contact information could also be hidden from the calling party thereby, for example, protecting the identity of the callee/contactee. Additionally, as will be appreciated, even though the term "dial" is used to establish a communication session with the object, it should be appreciated that it includes additional functionality such as allowing the user to initiate a browser session and connect to a web page associated with the object, or in general establish any type of communication session, be it audio, video, multimedia, internet-based, or the like, with the object. Control then continues to step S480.

In step S480, the communication session is established and information one or more of pushed and pulled, as well as optional streaming content and/or streaming information provided to communications device 100. Control then continues to step S490 where the control sequence ends.

As an optional extension to the above techniques, the information exchanged upon the commencing of a communication session can be dynamic, based on one or more of profile information associated with a caller, presence information, context and content. For example, a caller casts-to-connect to a billboard that is displaying a specific advertisement. Once it is determined what the contact information for the billboard is, a quick search can be performed to determine if the caller ID information associated with the caller is correlatable, via a database query, to a current customer of the company running the advertisement. If the caller is a current customer, perhaps a special promotion can be provided to that existing customer via an email sent to the caller's email address. However, if the caller ID information cannot be correlated to a current customer, one option would be for a call center associated with the company running the advertisement to initiate a call to the caller, to perhaps to assist them with any questions they have regarding the product and/or service being advertised.

In accordance with another exemplary optional embodiment, general information may be associated with a plurality of objects. As a specific example, all police, firefighters, and their associated equipment, such as police cars, police motorcycles, and fire trucks can be associated with the 911 emergency number. Therefore, if a caller casts in the direction of one of these objects, such as a police car, a 911 call can automatically be established by the communications device to a 911 operator.

In accordance with yet another optional embodiment, the direction and motion of the communications device, as detected by one or more of the accelerometers and gyroscopes, can be used to facilitate a type of communication session the user would like to establish. For example, if the user casts the communications device in an outbound direction, without returning the device in a similarly quick manner towards the user, the device can be programmed to assume that the user would like to make an outbound contact with that other object, entity, or person. However, should the user's cast include both an outbound motion, and a similar return motion, that could be correlated to the user requesting to receive information from the object, entity, or person they are attempting to establish a communications session with. For example, if using this second type of casting motion toward a billboard, dynamic content from the billboard could be pushed to the user's communications device. Using the example of the first type of motion, and the previous example of a fellow motorist with a flat tire, perhaps only an outbound casting motion is necessary with an accompanying text that says "your driver's side rear tire is going flat."

As another exemplary embodiment, the casting motion can be used to send an invite to another party. For example, if a user casts toward the motorist with the flat tire, the device associated with the motorist with the flat tire could receive an "invitation" that states another party is trying to contact you. Optionally, based for example on one or more rules, one or more pieces of personal information associated with the caller can be forwarded with the invite to the motorist. Similarly, information such as a message stating "Your tire is going flat, I would like to speak with you ASAP" could also accompany the invitation. The motorist, after reviewing this information, could then choose whether or not they would like to accept the incoming communication.

In general, any detectable motion by the communications device can be correlated to one or more specific actions, the actions governing one or more of connectability to another entity, user, or device, selection of specific information, or in general any functionality of the communications device.

The various embodiments include components, methods, processes, systems and/or apparatus substantially as depicted and described herein, including various embodiments, sub-combinations, and subsets thereof. Those of skill in the art will understand how to make and use the present invention after understanding the present disclosure. The disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features are grouped together in one or more embodiments for the purpose of streamlining the disclosure. This method of disclosure is not to be interpreted as reflecting an intention that the claimed subject matter requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as separate preferred embodiments.

Moreover, though the description of the invention has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols described herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques disclosed herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for enhancing communications. While the embodiments have been described in conjunction with a number of features, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method to contact one or more of a person, entity and object comprising:
   determining a two-dimensional or three dimensional sensible zone associated with a cast-to-connect motion of a communications device, wherein the cast-to-connect motion includes a call vector that includes a position and velocity and wherein the sensible zone is determined based on the position and velocity;
   determining a presence of the one or more of a person, entity and object within the sensible zone;
   determining, with the cooperation of a coordinate-to-number reconciliation module, contact information associated with the one or more of a person, entity and object within the sensible zone; and
   establishing a communication with the one or more of a person, entity and object within the sensible zone.

2. The method of claim 1, further comprising dialing a number associated with the one or more of a person, entity and object within the sensible zone.

3. The method of claim 1, further comprising querying a user as to which one of the one or more of a person, entity and object within the sensible zone to connect to.

4. The method of claim 1, wherein establishing the communication includes automatically dialing a number associated with the one or more of a person, entity and object within the sensible zone.

5. The method of claim 1, further comprising providing a list of potential contactees based on the presence of the one or more of the person, entity and object within the sensible zone.

6. The method of claim 1, further comprising providing a plurality of contact options to a caller.

7. The method of claim 1, further comprising receiving input from one or more of an accelerometer and gyroscope as input for the cast-to-connect motion.

8. The method of claim 1, further comprising determining a location of a caller.

9. One or more means for performing the steps of claim 1.

10. A non-transitory computer readable information storage media having stored thereon instructions, that when executed by a processor, perform the steps of claim 1.

11. A system to contact one or more of a person, entity and object comprising:
    a sensible zone management module that determines a two-dimensional or three dimensional sensible zone associated with a cast-to-connect motion of a communications device, wherein the cast-to-connect motion includes a call vector that includes a position and velocity and wherein the sensible zone is determined based on the position and velocity;
    a location manager that determined a presence of the one or more of a person, entity and object within the sensible zone;
    a coordinate-to-number reconciliation module that determines contact information associated with the one or more of a person, entity and object within the sensible zone; and
    an auto-dialer that establishes a communication with the one or more of a person, entity and object within the sensible zone.

12. The system of claim 11, wherein the auto-dialer dials a number associated with the one or more of the one or more of a person, entity and object within the sensible zone.

13. The method of claim 1, wherein a user defines a cast distance for the sensible zone.

14. The method of claim 1, wherein the sensible zone is the two-dimensional sensible zone.

15. The system of claim 11, further comprising a display and input device that queries a user as to which one of the one or more of a person, entity and object within the sensible zone to connect to.

16. The system of claim 11, wherein establishing the communication includes automatically dialing a number associated with the one or more of a person, entity and object within the sensible zone.

17. The system of claim 11, wherein a list of potential contactees is provided to a user based on the presence of the one or more of the person, entity and object within the sensible zone.

18. The system of claim 11, wherein a plurality of contact options are provided to a caller.

19. The system of claim 11, further comprising one or more of an accelerometer and gyroscope that provide input for the cast-to-connect motion.

20. The system of claim 11, further comprising a GPS module that determines a location of a caller.

* * * * *